United States Patent
Tsutsumi et al.

(10) Patent No.: US 12,486,662 B2
(45) Date of Patent: Dec. 2, 2025

(54) ANCHOR SUPPORT MEMBER

(71) Applicant: Sekisui House, Ltd., Osaka (JP)

(72) Inventors: Tetsufumi Tsutsumi, Osaka (JP); Yoshiyuki Matsubara, Osaka (JP); Hideki Watanabe, Osaka (JP)

(73) Assignee: Sekisui House, Ltd., Osaka (JP)

( * ) Notice: Subject to any disclaimer, the term of this patent is extended or adjusted under 35 U.S.C. 154(b) by 202 days.

(21) Appl. No.: 18/273,023

(22) PCT Filed: Feb. 2, 2021

(86) PCT No.: PCT/JP2021/003641
§ 371 (c)(1),
(2) Date: Jul. 18, 2023

(87) PCT Pub. No.: WO2022/168138
PCT Pub. Date: Aug. 11, 2022

(65) Prior Publication Data
US 2024/0117926 A1    Apr. 11, 2024

(51) Int. Cl.
*E04B 1/41* (2006.01)
*E02D 5/80* (2006.01)
*F16M 13/02* (2006.01)

(52) U.S. Cl.
CPC ............ *E04B 1/4157* (2013.01); *E02D 5/808* (2013.01); *E02D 2600/30* (2013.01); *F16M 13/022* (2013.01)

(58) Field of Classification Search
CPC .. E04B 1/4157; E02D 2600/30; E04G 21/185
See application file for complete search history.

(56) References Cited

U.S. PATENT DOCUMENTS 6,508,447 B1 * 1/2003 Catani ................ E04C 5/18
248/65
9,010,063 B2 * 4/2015 Spruiell ............... E04G 21/185
52/699

FOREIGN PATENT DOCUMENTS

| JP | H10-131203 A | 5/1998 |
| JP | 2002-356853 A | 12/2002 |
| JP | 2008-144425 A | 6/2008 |
| JP | 2008-274713 A | 11/2008 |

OTHER PUBLICATIONS

International Search Report dated Apr. 13, 2021, in connection with International Application No. PCT/JP2021/003641.

* cited by examiner

*Primary Examiner* — Patrick J Maestri
(74) *Attorney, Agent, or Firm* — Wolf, Greenfield & Sacks, P.C.

(57) ABSTRACT

An anchor support member supports an anchor bolt provided to the foundation of a building, and comprises: an attaching part that is attached to a formwork of the foundation; a retaining part that is connected to the attaching part and retains the anchor bolt; and a securing part that secures the attaching part to the formwork. The securing part secures the attaching part to the formwork such that the position of the anchor support member can be adjusted in a prescribed direction.

7 Claims, 9 Drawing Sheets

ANCHOR SUPPORT MEMBER

CROSS REFERENCE TO RELATED APPLICATIONS

This Application is a national stage filing under 35 U.S.C. 371 of International Patent Application Serial No. PCT/JP2021/003641, filed Feb. 2, 2021, entitled "ANCHOR SUPPORT MEMBER." The entire content of this application is incorporated herein by reference in its entirety.

TECHNICAL FIELD

The present invention relates to an anchor support member that supports an anchor bolt.

BACKGROUND ART

Anchor bolts extending in the vertical direction are arranged in the foundation of a construction. Patent Literature 1 discloses an anchor support member that supports an anchor bolt. When forming a foundation, the anchor support member supports an anchor bolt arranged at a portion where the foundation rises. The anchor support member includes an anchor holding portion (member including an insertion portion in same Patent Literature) and two fastening portions (attaching portions in same Patent Literature) fastened to foundation-placing formworks. The fastening portions are respectively fastened to two formworks where the foundation rises. The anchor holding portion is located between and supported by the two fastening portions.

CITATION LIST

Patent Literature

Patent Literature 1: Japanese Laid-Open Patent Publication No. 10-131203

SUMMARY OF INVENTION

Technical Problem

Anchor bolts may be arranged at locations where the foundation does not rise. For example, there may be only one formwork arranged at a location separated by a predetermined distance from an anchor. In this case, the conventional support member will be difficult to use.

Solution to Problem (1) An anchor support member that solves the above problem supports an anchor bolt arranged in a foundation of a construction. The anchor support member includes an attached portion attached to a formwork of the foundation, a holding portion connected to the attached portion to hold the anchor bolt, and a fastening portion that fastens the attached portion to the formwork so as to allow for position adjustment of the anchor support member in a predetermined direction. This structure supports the anchor bolt regardless of the number of formworks near the anchor bolt, and allows the position of the anchor bolt to be adjusted.

(2) In the anchor support member of paragraph (1), the fastening portion includes two guide rails fixed to the formwork, two guides arranged in the attached portion, and a coupling member. The two guide rails are located between the formwork and the attached portion so as to extend parallel to each other in the predetermined direction. The guides are configured to be guided by the guide rails. The coupling member couples the attached portion to the formwork.

With this structure, the two guide rails, the guides, and the coupling member fasten the anchor support member to the formwork in a manner allowing for position adjustment of the anchor support member in the predetermined direction. Further, the anchor support member is fastened so as not to rotate relative to the formwork.

(3) In the anchor support member of paragraph (1), the fastening portion includes two guide rails fixed to the formwork, two guide holes arranged in the attached portion, two guides, and a coupling member. The two guide rails are located between the formwork and the attached portion so as to extend parallel to each other in the predetermined direction. The two guide holes arranged in the attached portion extend in a direction intersecting the predetermined direction. The guides include first portions guided by the guide rails, and second portions guided by the guide holes. The coupling member couples the attached portion to the formwork.

With this structure, the two guide rails, the two guide holes, the guides, and the coupling member fasten the anchor support member to the formwork in a manner allowing for position adjustment of the anchor support member in the predetermined direction and the direction intersecting the predetermined direction. Further, the anchor support member is fastened so as not to rotate relative to the formwork.

(4) In the anchor support member of paragraph (1), the fastening portion includes two guide holes and a coupling member. The two guide holes arranged in the attached portion extend parallel to each other in the predetermined direction. The coupling member couples the attached portion to the formwork.

With this structure, the two guide holes and the coupling member fasten the anchor support member to the formwork in a manner allowing for position adjustment of the anchor support member in the predetermined direction. Further, the anchor support member is fastened so as not to rotate relative to the formwork.

(5) The anchor support member of any one of paragraphs (1) to (4) further includes a spacer located between the attached portion and the formwork. This structure allows the distance between the attached portion and the formwork to be adjusted. As a result, the position of the attached portion can be adjusted in a direction extending away from the formwork.

(6) In the anchor support member of any one of paragraphs (1) to (5), the holding portion includes an insertion hole into which the anchor bolt is inserted, and a reference mark located at a predetermined position relative to the insertion hole. This structure allows the position of the anchor bolt to be adjusted by aligning the reference mark with a reference line.

(7) In the anchor support member of any one of paragraphs (1) to (6), the holding portion extends orthogonal to the attached portion. This structure fastens the attached portion to a side surface of the formwork so that the holding portion is arranged orthogonal to the side surface of the formwork.

(8) In the anchor support member of any one of paragraphs (1) to (6), the holding portion is connected by an intermediate portion to the attached portion and is parallel to the attached portion. This structure fastens the attached portion to an upper surface of the formwork so that the holding portion is arranged parallel to the upper surface of the formwork.

Advantageous Effects of Invention

The anchor support member supports the anchor bolt regardless of the number of formworks near the anchor bolt, and allows the position of the anchor bolt to be adjusted.

DESCRIPTION OF EMBODIMENTS

An anchor support member will now be described with reference to FIGS. 1 to 8.

Figure 1:
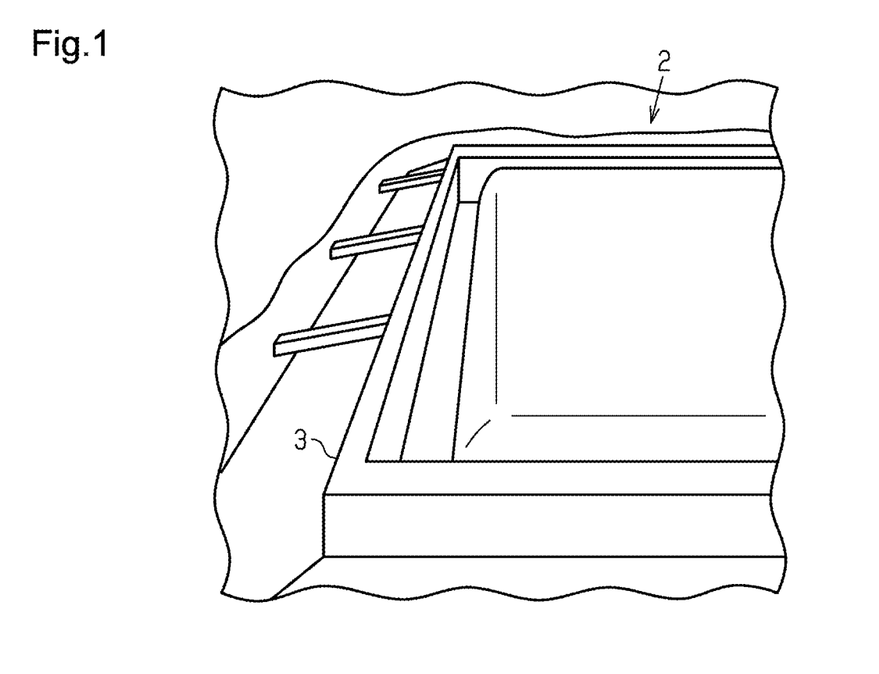
FIG. 1 is a perspective view of foundation-installed ground.

FIG. 1 shows the ground (hereafter, foundation-installed ground 2) where a foundation 1 of a construction is installed. When forming the foundation 1, a formwork 3 is arranged around the foundation-installed ground 2. In this example, a raft foundation having no rising portions is formed (refer to FIG. 8).

Figure 8:
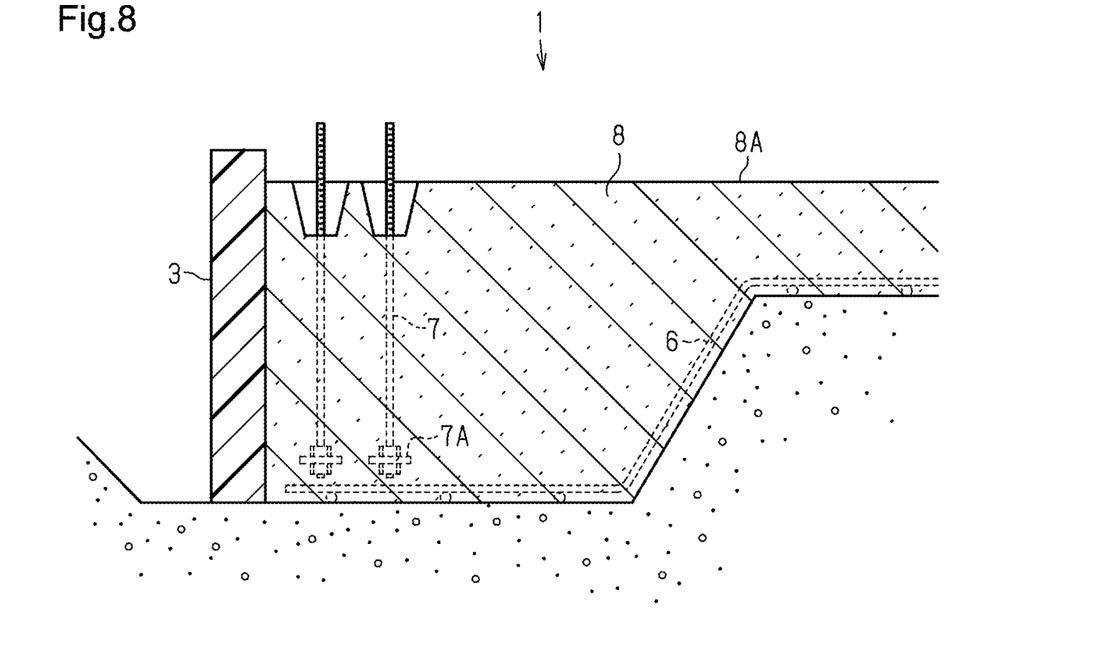
FIG. 8 is a cross-sectional view of the foundation showing a state without the anchor support member.

As shown in FIG. 8, the foundation 1 includes steel bars 6 arranged along the foundation-installed ground 2, anchor bolts 7 arranged around the periphery of the foundation 1, and concrete 8. The anchor bolts 7 extend in the vertical direction. The upper portion of each anchor bolt 7 is exposed from the concrete 8.

Figure 2:
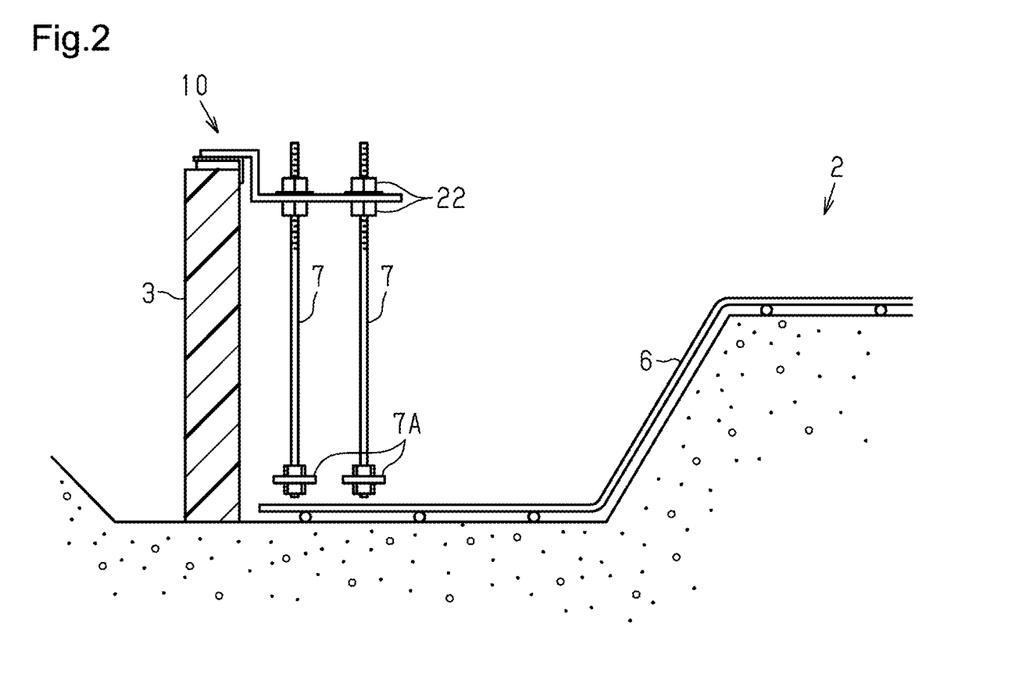
FIG. 2 is a cross-sectional view of the foundation-installed ground where anchor bolts and steel bars are arranged.

As shown in FIG. 2, the steel bars 6 and the anchor bolts 7 are disposed on the foundation-installed ground 2 before pouring concrete. A building body is fixed by the anchor bolts 7 to the foundation 1. Thus, it is preferable that the anchor bolts 7 be positioned accurately.

The anchor bolts 7 are supported by anchor support members 10 attached to the formwork 3. The anchor support members 10 are cantilevers supported by the formwork 3. The anchor support members 10 each include an attached portion 11 attached to the formwork 3 and a holding portion 12 located at a side opposite the attached portion 11 to support the anchor bolts 7. A weight 7A is attached to the lower end of each anchor bolt 7. The upper portion of each anchor bolt 7 is supported by an anchor support member 10. The load of the weight 7A acts to have the anchor bolt 7 extend in the vertical direction. The position of the anchor bolt 7 is adjusted by adjusting the position of the anchor support member 10 relative to the formwork 3.

With reference to FIGS. 1 to 6, the anchor support member 10 will now be described.

Figure 3:
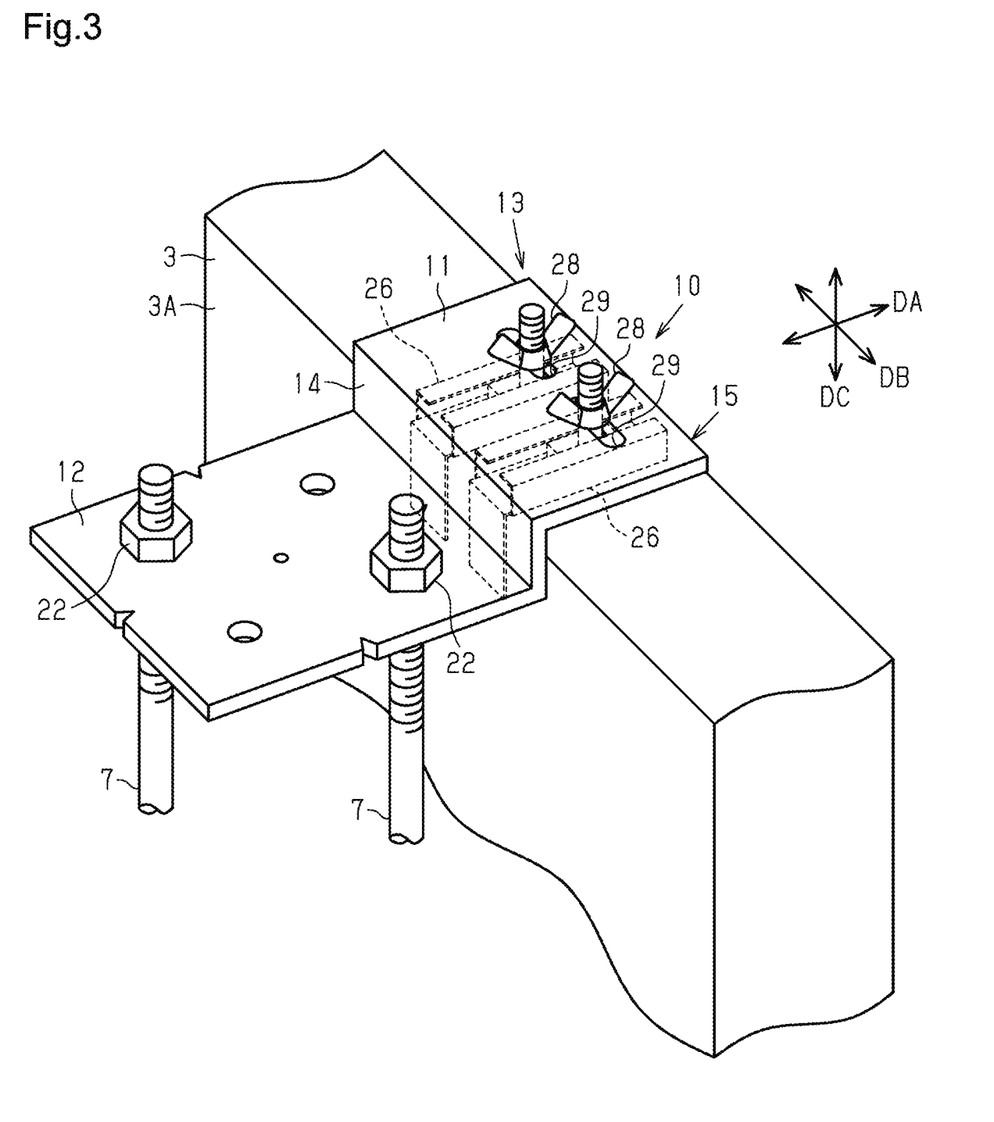
FIG. 3 is a perspective view of an anchor support member.
Figure 4:
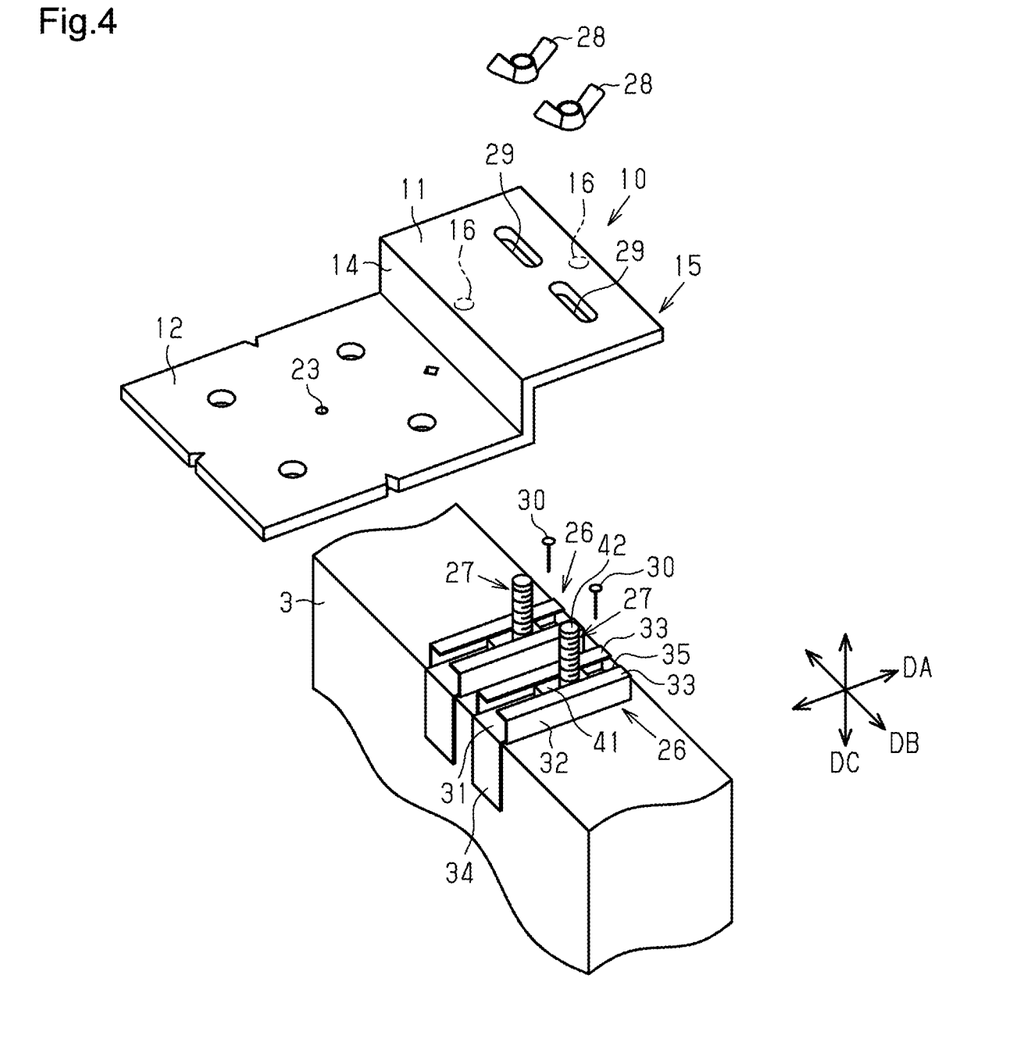
FIG. 4 is an exploded perspective view of the anchor support member.

As shown in FIGS. 3 and 4, the anchor support member 10 supports the anchor bolts 7. The anchor support member 10 includes the attached portion 11, the holding portion 12, and a fastening portion 13.

The holding portion 12 holds the anchor bolts 7. The holding portion 12 is connected to the attached portion 11. In the present embodiment, the holding portion 12 is connected by an intermediate portion 14 to the attached portion 11. The intermediate portion 14 is arranged orthogonally at the end of the attached portion 11. In one example, the holding portion 12 has the form of a plate. The holding portion 12 is arranged on the lower end of the intermediate portion 14 to extend parallel to the attached portion 11. The holding portion 12 is formed integrally with the intermediate portion 14 and the attached portion 11. In one example, the holding portion 12, the intermediate portion 14, and the attached portion 11 are formed by bending a plate with a press. In the description hereafter, the member including the holding portion 12, the intermediate portion 14, and the attached portion 11 will be referred to as the anchor support body 15.

The holding portion 12 includes insertion holes 21 into which the anchor bolts 7 are inserted. In one example, the anchor bolts 7 are inserted into the insertion holes 21 and fastened by nuts 22 to the holding portion 12. The holding portion 12 includes one or more insertion holes 21. The insertion holes 21 are sized to allow for insertion of the anchor bolts 7. The lower surface of the holding portion 12 is used as a reference surface for the upper surface 8A of the concrete 8 of the foundation 1.

The holding portion 12 further includes a reference mark 23. The reference mark 23 is located at a predetermined position relative to the insertion holes 21. The reference mark 23 is used for position adjustment of the anchor bolts 7. When adjusting the positions of the anchor bolts 7, the reference mark 23 is aligned with a reference line. Examples of the reference line include a leveling line and a laser beam of a laser marking device.

The attached portion 11 is attached to the formwork 3 of the foundation 1. The attached portion 11 is attached by the fastening portion 13 to the formwork 3. The attached portion 11 has, for example, the form of a plate. The attached portion 11 may have a thickness that is the same as the thickness of the holding portion 12 or not the same as the thickness of the holding portion 12.

The fastening portion 13 fastens the attached portion 11 to the formwork 3. The fastening portion 13 fastens the attached portion 11 to the formwork 3 to allow for position adjustment of the anchor support member 10 in a predetermined direction. More specifically, the fastening portion 13 includes two guide rails 26, two guides 27 arranged in the attached portion 11, and coupling members 28. In the present embodiment, the fastening portion 13 further includes two guide holes 29.

The two guide rails 26 are located between the formwork 3 and the attached portion 11. The two guide rails 26 are fixed by coupling members 30 to the formwork 3. Examples of the coupling members 30 include nails, wood screws, and fasteners. The two guide rails 26 extend parallel to each other in the predetermined direction. The predetermined direction is set in advance as the direction in which the anchor bolts 7 are moved when adjusting the positions of the anchor bolts 7. In one example, the predetermined direction is one of a first direction DA, a second direction DB, and a third direction DC. The first direction DA is a widthwise direction of the formwork 3. The second direction DB is a direction extending along a side surface 3A of the formwork 3 and orthogonal to the first direction DA and the third direction DC. The third direction DC is the vertical direction. In the present embodiment, the guide rails 26 are arranged so that the longitudinal direction of the guide rails 26 corresponds to the first direction DA.

As shown in FIG. 4, the guide rails 26 each include a bottom wall 31, two side walls 32, and two upper walls 33. An extension 34 extends downward from one longitudinal end of the bottom wall 31. The extension 34 extends orthogonal to the bottom wall 31. The extension 34 is used when setting the orientation of the guide rail 26 relative to the formwork 3. More specifically, when attaching the guide rail 26 to the formwork 3, the extension 34 is pressed against the side surface 3A of the formwork 3. This orients the guide rail 26 so that the longitudinal direction of the guide rail 26 corresponds to the first direction DA.

The side walls 32 are arranged on the two ends of the bottom wall 31 in the widthwise direction of the bottom wall 31. The side walls 32 extend in the longitudinal direction of the bottom wall 31. Each upper wall 33 is arranged on the upper end of the corresponding one of the two side walls 32. The upper walls 33 extend in the longitudinal direction of the bottom wall 31. A gap 35 that guides a second portion 42 of the guide 27 extends between the upper walls 33.

The attached portion 11 includes the two guide holes 29. The two guide holes 29 in the attached portion 11 extend in a direction intersecting the predetermined direction. The direction intersecting the predetermined direction is set in advance as the direction in which the anchor bolts 7 are moved when adjusting the positions of the anchor bolts 7. In the present embodiment, the predetermined direction is the first direction DA. The direction intersecting the predetermined direction is the second direction DB.

Figure 5:
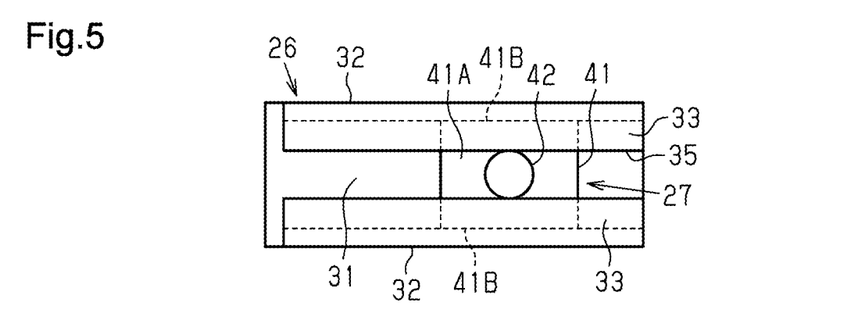
FIG. 5 is a plan view of a guide rail and a guide.

As shown in FIG. 5, the guide 27 is guided by the guide rail 26. The guide 27 includes a first portion 41, guided by the guide rail 26, and the second portion 42, guided by the guide hole 29.

The first portion 41 is located in the guide rail 26 between the bottom wall 31 and the upper walls 33. The first portion 41 has the form of a plate. The first portion 41 includes an upper surface 41A. The upper surface 41A faces the upper walls 33 of the guide rail 26. The first portion 41 includes two guide surfaces 41B. The guide surfaces 41B face the side walls 32 of the guide rail 26.

The second portion 42 projects upward from the first portion 41. The second portion 42 has the form of a bolt. The second portion 42 is inserted through the gap 35 of the guide rail 26 and through the guide hole 29.

The coupling members 28 couple the attached portion 11 to the formwork 3. In the present embodiment, the coupling members 28 couple the attached portion 11 to the formwork 3 with the guide rails 26 arranged in between. The coupling members 28 couple the attached portion 11 to the guide rails 26. The coupling members 28 have the form of nuts attached to the second portions 42 of the guides 27. The coupling members 28 may be hexagonal nuts or wingnuts. The nuts attached to the second portions 42 are tightened to fasten the attached portion 11 to the guide rails 26.

The coupling members 28 may directly couple the attached portion 11 to the formwork 3. In one example, the coupling members 28 are screws, fasteners, or rivets. In this case, the attached portion 11 includes through holes 16 for insertion of the coupling members 28 (refer to FIG. 4). The through holes 16 are formed so that the coupling members 28 can be fitted therein. The coupling members 28 are inserted through the through holes 16 and driven into the formwork 3.

Figure 6:
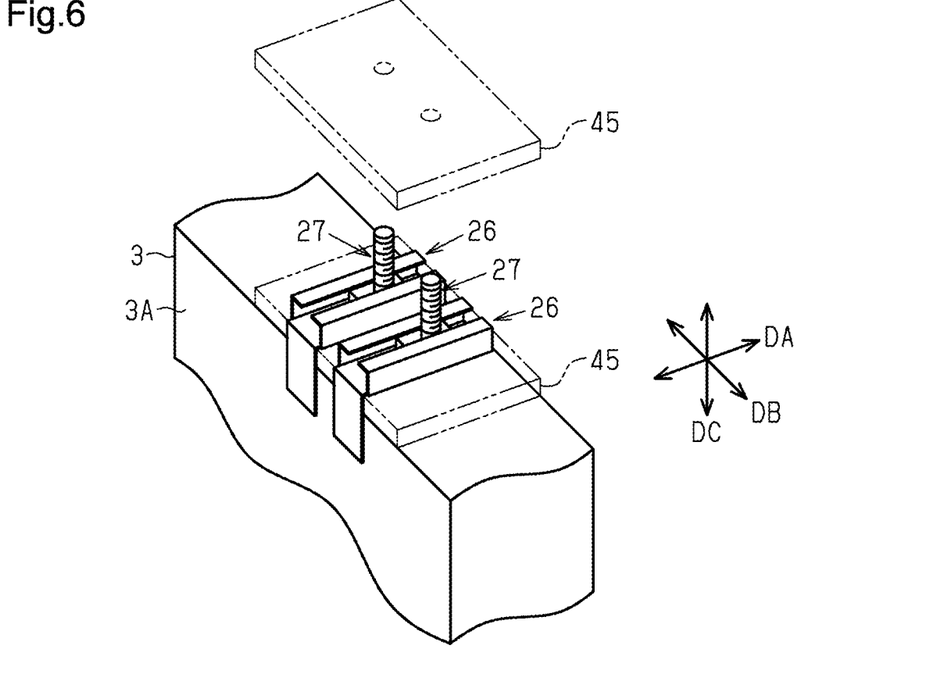
FIG. 6 is a perspective view of the guide rails, the guides, and a spacer.

As shown in FIG. 6, the anchor support member 10 may further include a spacer 45. The spacer 45 is located between the attached portion 11 and the formwork 3. In one example, the spacer 45 is located between the guide rails 26 and the formwork 3. In another example, the spacer 45 is located between the guide rails 26 and the attached portion 11. In a further example, the anchor support member 10 includes two spacers 45. One of the spacers 45 is located between the guide rails 26 and the formwork 3. The other one of the spacers 45 is located between the guide rails 26 and the attached portion 11. Such arrangements allow the position of the attached portion 11 to be adjusted in a direction extending away from the formwork 3. In the present embodiment, the position of the holding portion 12 can be adjusted in the vertical direction. Since the lower surface of the holding portion 12 is used as the reference surface for the upper surface 8A of the concrete 8 of the foundation 1, the positioning accuracy for the upper surface 8A of the concrete 8 can be increased.

Figure 7:
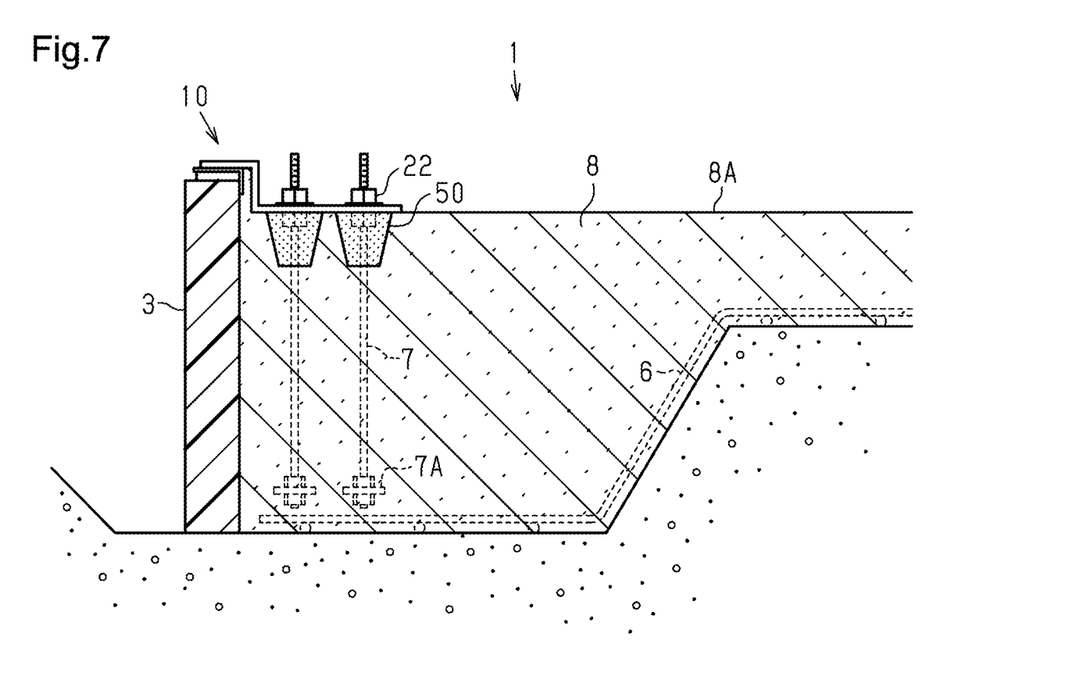
FIG. 7 is a cross-sectional view of the foundation in a state in which concrete has been placed.

With reference to FIGS. 2, 7, and 8, usage examples of the anchor support member 10 and formation of the foundation 1 will now be described.

As shown in FIG. 2, the formwork 3 is arranged around the foundation-installed ground 2. The steel bars 6 are arranged on the foundation-installed ground 2. The anchor support members 10 are attached to the formwork 3. The anchor bolts 7 are attached to the holding portions 12 of the anchor support members 10 with the weight 7A attached to the lower end of each anchor bolt 7. Then, a leveling line is extended to serve as a reference for the reference mark 23 of the holding portion 12. The position of each anchor support body 15 is adjusted to align the reference mark 23 with the leveling line. When position adjustment of the anchor support body 15 is completed, the coupling members 28 fasten the attached portion 11 to the formwork 3.

As shown in FIG. 7, a protector 50 protects a portion of the anchor bolt 7 that extends from the lower surface of the holding portion 12 for a predetermined distance. The protector 50 is formed from sponge. Then, concrete is poured up to the lower surface of the holding portion 12 and cured.

As shown in FIG. 8, after the concrete is cured, the anchor support bodies 15 and the protectors 50 are removed from the anchor bolts 7. The portion of each anchor bolt 7 extending from the lower surface of the holding portion 12 for the predetermined distance is protected by the corresponding protector 50 and thus not buried in the concrete. This facilitates removal of the anchor support body 15. A laser marking device is set to further finely adjust the position of each anchor bolt 7. A laser beam is used as a reference to finely adjust the position of the anchor bolt 7. In one example, the portion of the anchor bolt 7 exposed from the concrete 8 is bent several millimeters at a time by a tool. Portions in the concrete 8 where the protectors 50 are removed may be buried with additional concrete.

The operation of the present embodiment will now be described.

The anchor support member 10 includes the holding portion 12, which holds the anchor bolts 7, the attached portion 11, and the fastening portion 13. The fastening portion 13 fastens the attached portion 11 to the formwork 3. The anchor support member 10 is a cantilever that supports the anchor bolt 7. Such a structure allows the anchor bolts 7 to be supported by the single formwork 3.

The advantages of the present embodiment will now be described.

(1) The anchor support member 10 includes the attached portion 11, which is attached to the formwork 3 of the foundation 1, the holding portion 12, which holds the anchor bolts 7, and the fastening portion 13, which fastens the attached portion 11 to the formwork 3. The fastening portion 13 fastens the attached portion 11 to the formwork 3 and allows for position adjustment of the anchor support member 10 in a predetermined direction. This structure supports the anchor bolts 7 regardless of the number of formworks 3 near the anchor bolts 7, and allows the positions of the anchor bolts 7 to be adjusted.

(2) The fastening portion 13 includes the two guide rails 26, which are fixed to the formwork 3, the two guides 27, which are arranged in the attached portion 11, and the coupling members 28. The two guide rails 26 are located between the formwork 3 and the attached portion 11 so as to extend parallel to each other in the predetermined direction. The guides 27 are configured to be guided by the guide rails 26. The coupling members 28 couple the attached portion 11 to the formwork 3.

With this structure, the two guide rails 26, the guides 27, and the coupling members 28 fasten the anchor support member 10 to the formwork 3 in a manner allowing for position adjustment of the anchor support member 10 in the predetermined direction. Further, each guide rail 26 is structured to guide the corresponding guide 27. This restricts rotation of the anchor support member 10 relative to the formwork 3. Thus, the anchor support member 10 is fixed so that the anchor support member 10 does not rotate relative to the formwork 3.

(3) The fastening portion 13 further includes the two guide holes 29 arranged in the attached portion 11. The two guide holes 29 arranged in the attached portion 11 extend in the direction intersecting the predetermined direction. Each guide 27 includes the first portion 41, guided by the corresponding guide rail 26, and the second portion 42, guided by the corresponding guide hole 29.

With this structure, the two guide rails 26, the two guide holes 29, the guides 27, and the coupling members 28 fasten the anchor support member 10 to the formwork 3 in a manner allowing for position adjustment of the anchor support member 10 in the predetermined direction and the direction intersecting the predetermined direction. Further, each guide rail 26 is structured to guide the corresponding guide 27. This restricts rotation of the anchor support member 10 relative to the formwork 3. Thus, the anchor support member 10 is fixed so that the anchor support member 10 does not rotate relative to the formwork 3.

(4) The anchor support member 10 may further include the spacer 45 located between the attached portion 11 and the formwork 3. This structure allows the distance between the attached portion 11 and the formwork 3 to be adjusted. Such arrangement allows the position of the attached portion 11 to be adjusted in a direction extending away from the formwork 3.

(5) The holding portion 12 includes the insertion holes 21, into which the anchor bolts 7 are inserted, and the reference mark 23, located at a predetermined position relative to the insertion holes 21. This structure allows the positions of the anchor bolts 7 to be adjusted by aligning the reference mark 23 with a reference line.

(6) The holding portion 12 is connected by the intermediate portion 14 to the attached portion 11 and arranged parallel to the attached portion 11. This structure fastens the attached portion 11 to the upper surface of the formwork 3 so that the holding portion 12 is arranged parallel to the upper surface of the formwork 3.

MODIFIED EXAMPLES

The above embodiment is one example of the anchor support member 10 and not intended to limit the form of the anchor support member 10. The anchor support member 10 may be embodied in other various forms. For example, the structure in the above embodiment may be replaced, changed, or omitted in part or include an additional element. Modified examples of the embodiment will now be described. In the modified examples, same reference numerals are given to those components that are the same as the corresponding components of the above embodiment.

First Modified Example

Figure 9:
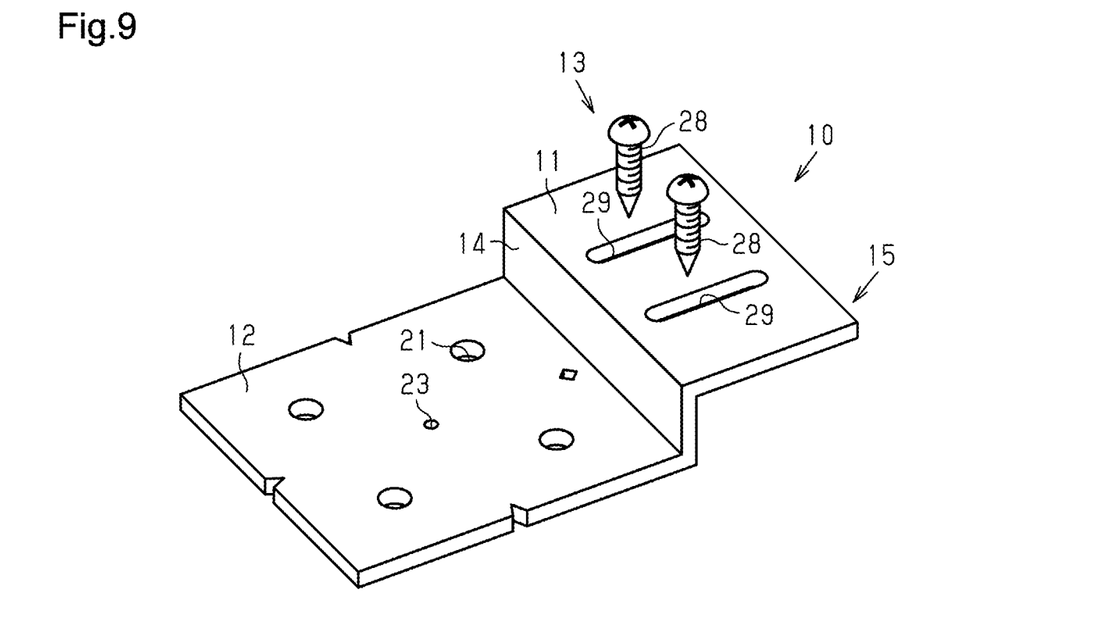
FIG. 9 is a perspective view showing a first modified example of the anchor support member.
Figure 10:
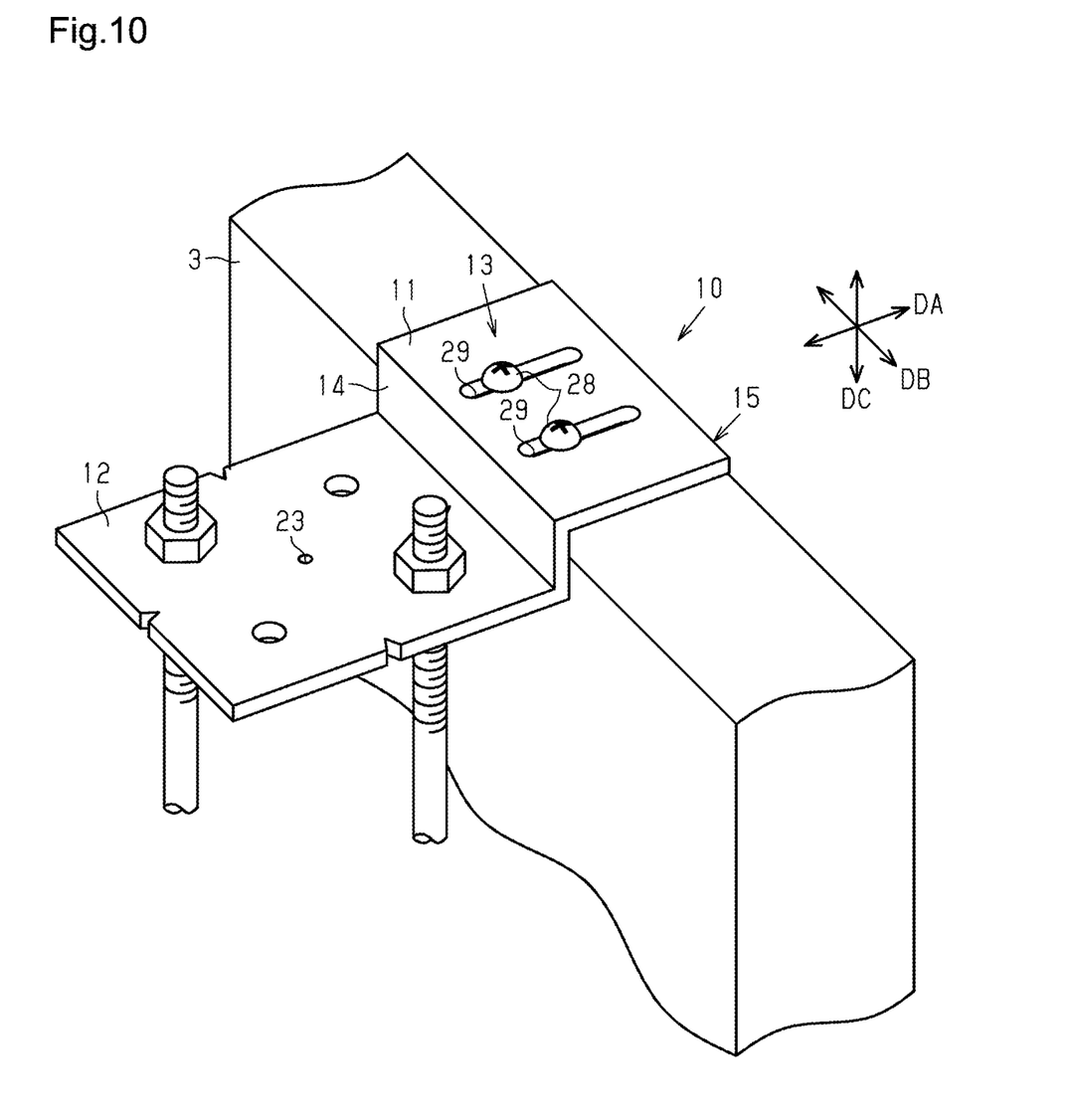
FIG. 10 is a perspective view of the anchor support member attached to a formwork.

As shown in FIGS. 9 and 10, the guide rails 26 may be omitted from the anchor support member 10.

The anchor support member 10 includes the attached portion 11, the holding portion 12, and the fastening portion 13. The holding portion 12 is connected by the intermediate portion 14 to the attached portion 11. The fastening portion 13 includes the two guide holes 29 and the coupling members 28. The two guide holes 29 arranged in the attached portion 11 extend parallel to each other in a predetermined direction. More specifically, the two guide holes 29 extend in the first direction DA. The coupling members 28 couple the attached portion 11 to the formwork 3. The coupling members 28 are inserted through the guide holes 29 and driven into the formwork 3.

As shown in FIG. 10, the anchor support member 10 is fixed directly to the formwork 3. The anchor support member 10 undergoes position adjustment in a state temporarily fastened by the coupling members 28.

With this structure, the two guide holes 29 and the coupling members 28 fasten the anchor support member 10 to the formwork 3 in a manner allowing for position adjustment of the anchor support member 10 in the predetermined direction. Further, the anchor support member 10 is fastened so as not to rotate relative to the formwork 3.

Second Modified Example

Figure 11:
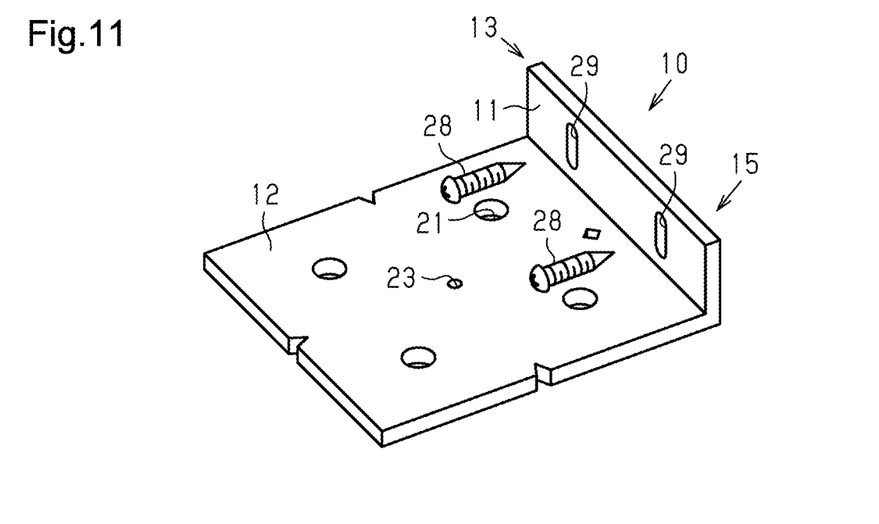
FIG. 11 is a perspective view showing a second modified example of the anchor support member.
Figure 12:
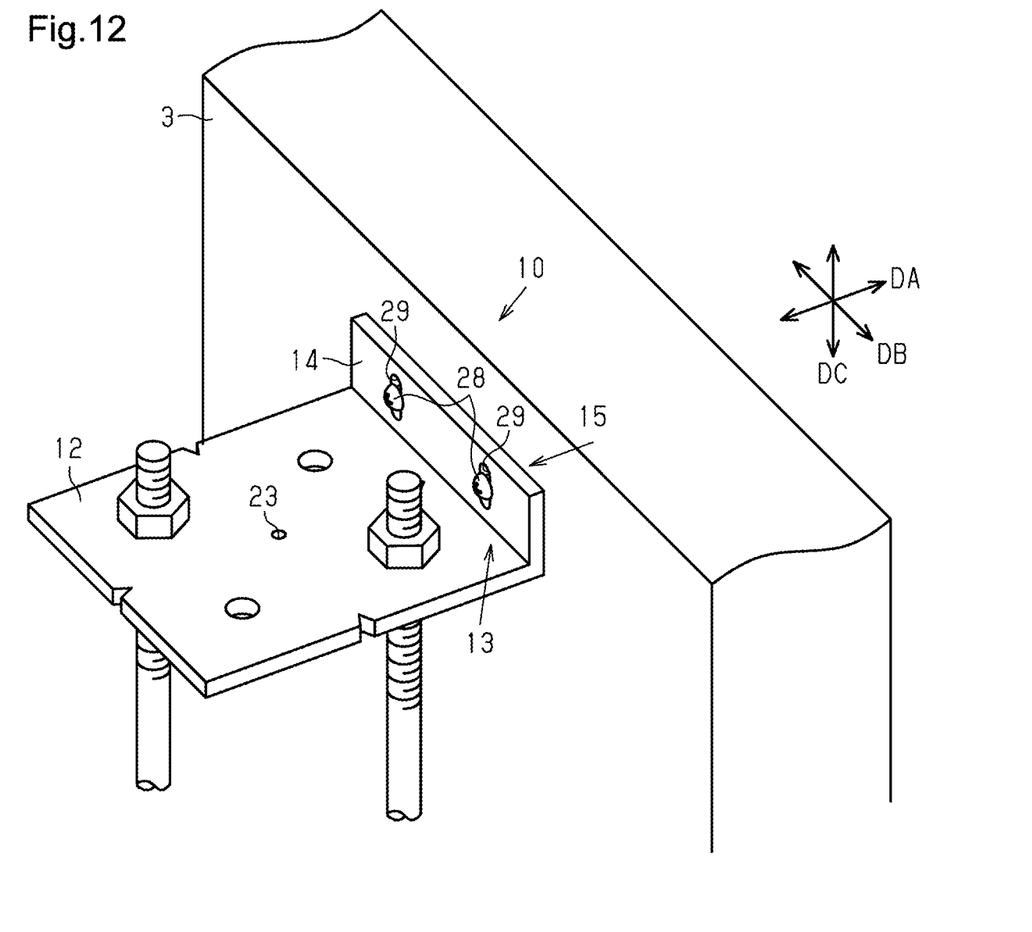
FIG. 12 is a perspective view of the anchor support member attached to a formwork.

As shown in FIGS. 11 and 12, the guide rails 26 may be omitted from the anchor support member 10. Further, in this example, the holding portion 12 is directly connected to the attached portion 11.

The anchor support member 10 includes the attached portion 11, the holding portion 12, and the fastening portion 13. The holding portion 12 is directly connected to the attached portion 11. The holding portion 12 is orthogonal to the attached portion 11.

The fastening portion 13 includes the two guide holes 29 and the coupling members 28. The two guide holes 29 arranged in the attached portion 11 extend parallel to each other in a predetermined direction. More specifically, the two guide holes 29 extend in the third direction DC. The coupling members 28 couple the attached portion 11 to the formwork 3. The coupling members 28 are inserted through the guide holes 29 and driven into the formwork 3.

As shown in FIG. 12, the anchor support member 10 is fixed directly to the formwork 3. The anchor support member 10 undergoes position adjustment in a state temporarily fastened by the coupling members 28.

This structure fastens the attached portion 11 to the side surface 3A of the formwork 3 so that the side surface 3A of the formwork 3 is orthogonal to the holding portion 12. More specifically, the anchor support member 10 is fastened to the side surface 3A of the formwork 3. The two guide holes 29 and the coupling members 28 fasten the anchor support member 10 to the formwork 3 in a manner allowing for position adjustment of the anchor support member 10 in the predetermined direction. The anchor support member 10 is fastened so as not to rotate relative to the formwork 3. Further, the position of the anchor support member 10 can be adjusted in the third direction DC.

Third Modified Example

Figure 13:
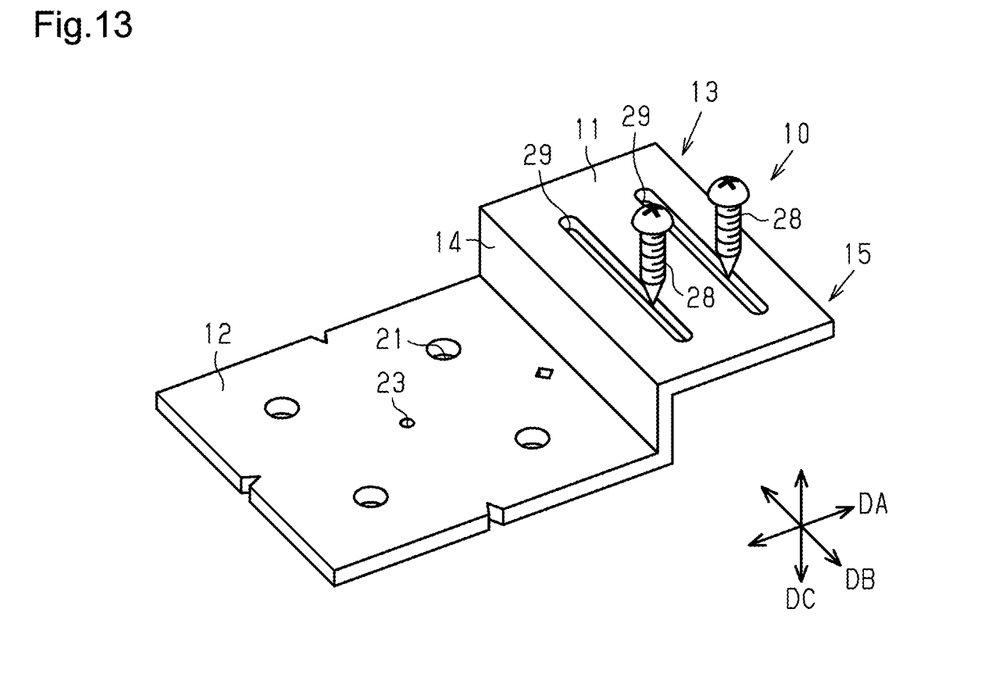
FIG. 13 is a perspective view showing a third modified example of the anchor support member.

As shown in FIG. 13, in the anchor support member 10, the guide holes 29 may extend in the second direction DB. Otherwise, the structure of the anchor support member 10 in this modified example is the same as the structure of the first modified example. This structure allows for position adjustment of the anchor support member 10 in the second direction DB.

Fourth Embodiment

Figure 14:
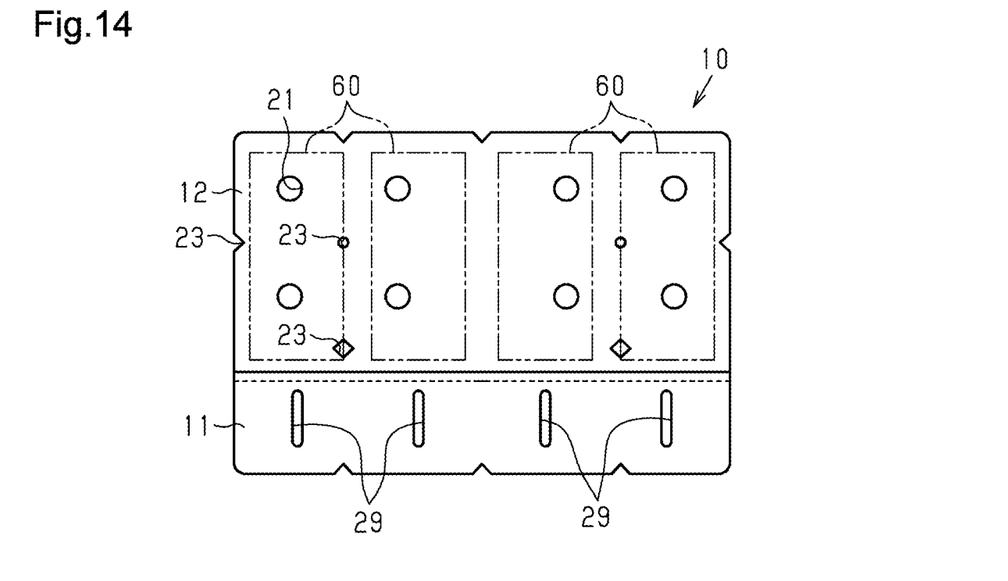
FIG. 14 is a perspective view showing a fourth modified example of the anchor support member.

As shown in FIG. 14, the attached portion 11 includes three or more guide holes 29. The three or more guide holes 29 extend parallel to one another. The holding portion 12 includes an anchor holding region 60 in the extension direction of the guide holes 29. The anchor holding region 60 includes the insertion holes 21 for insertion of the anchor bolts 7.

Figure 15:
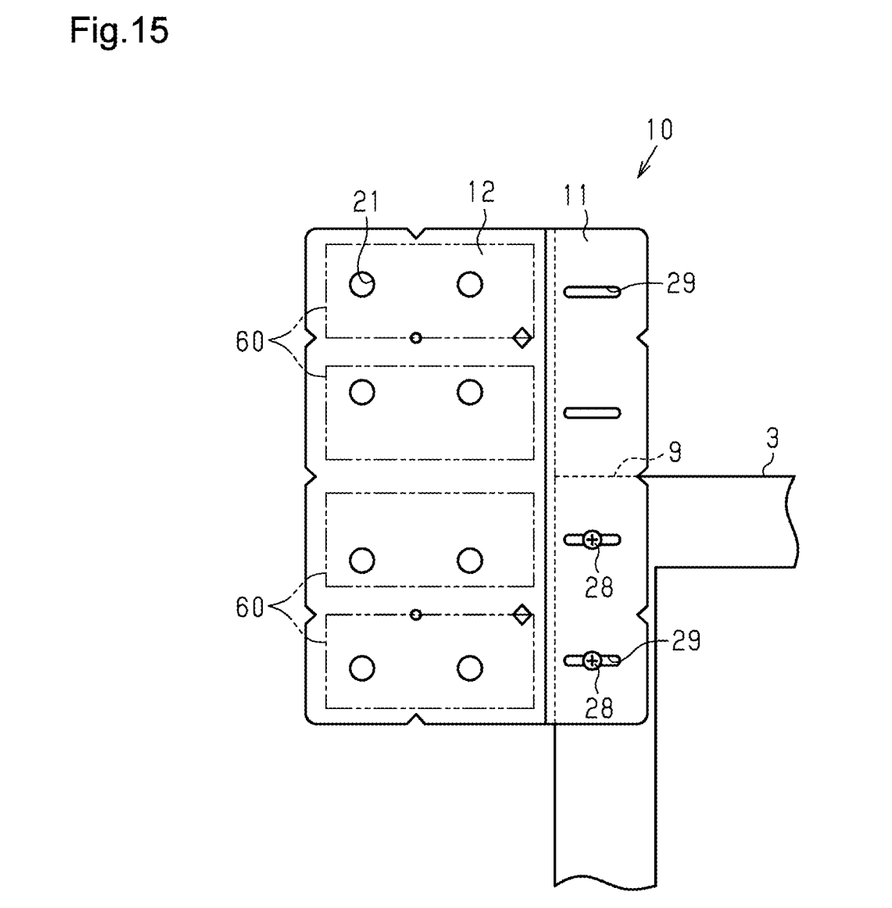
FIG. 15 is a plan view of the anchor support member attached to a formwork.

As shown in FIG. 15, two adjacent ones of the guide holes 29 are used to fasten the anchor support member 10. Such an anchor support member 10 allows the holding portion 12 to be arranged at a location separated from two formworks 3 at, for example, an inside corner 9 of the foundation 1. More specifically, the anchor holding region 60 that is located in the extension direction of the guide holes 29 that are not used for fixation can be arranged at the inside corner 9 distant from both of the two formworks 3. Thus, position adjustment of the anchor bolts 7 can be performed near the inside corner 9.

REFERENCE SIGNS LIST 1) foundation
3) formwork
7) anchor bolt
10) anchor support member
11) attached portion
12) holding portion
13) fastening portion
14) intermediate portion
21) insertion hole
23) reference mark
26) guide rail
28) coupling member
29) guide hole
30) coupling member
41) first portion
42) second portion
45) spacer

The invention claimed is:

1. An anchor support member that supports an anchor bolt arranged in a foundation of a construction, the anchor support member comprising:
   an attached portion attached to a formwork of the foundation;
   a holding portion connected to the attached portion to hold the anchor bolt; and
   a fastening portion that includes two guide rails fixed to the formwork, two guides arranged in the attached portion, and a coupling member and fastens the attached portion to the formwork so as to allow for position adjustment of the anchor support member in a predetermined direction, wherein:
   the two guide rails are located between the formwork and the attached portion so as to extend parallel to each other in the predetermined direction;
   the guides are configured to be guided by the guide rails; and
   the coupling member couples the attached portion to the formwork.

2. The anchor support member according to claim 1, wherein:
   the fastening portion includes two guide holes arranged in the attached portion;
   the two guide holes arranged in the attached portion extend in a direction intersecting the predetermined direction; and
   the guides include first portions guided by the guide rails, and second portions guided by the guide holes.

3. The anchor support member according to claim 1, wherein:
   the fastening portion includes two guide holes; and
   the two guide holes arranged in the attached portion extend parallel to each other in the predetermined direction.

4. The anchor support member according to claim 1, further comprising:
   a spacer located between the attached portion and the formwork.

5. The anchor support member according to claim 1, wherein the holding portion includes:
   an insertion hole into which the anchor bolt is inserted; and
   a reference mark located at a predetermined position relative to the insertion hole.

6. The anchor support member according to claim 1, wherein the holding portion extends orthogonal to the attached portion.

7. The anchor support member according to claim 1, wherein the holding portion is connected by an intermediate portion to the attached portion and is parallel to the attached portion.

* * * * *